Patented Mar. 15, 1949

2,464,203

UNITED STATES PATENT OFFICE 2,464,203

MANUFACTURE OF DIENOESTROL

Wallace Frank Short and Gordon Ivan Hobday, Nottingham, England, assignors to Boots Pure Drug Company Limited, Nottingham, England, a company of Great Britain No Drawing. Application May 10, 1944, Serial No. 534,988. In Great Britain May 21, 1943

18 Claims. (Cl. 260—470)

This invention relates to improved processes for the manufacture of $\gamma\delta$-bis-(4-hydroxyphenyl)-hexane-$\gamma\delta$-diol and of the dihydroxy compound $\gamma\delta$-bis-4-hydroxyphenyl-$\Delta\beta\delta$-hexadiene obtained from it by dehydration.

The latter (known as "Dienoestrol," B. M. J. 1942, 2, page 256) is of importance because it possesses oestrogenic properties.

It has previously been proposed to reduce p-hydroxypropiophenone to the pinacol, $\gamma\delta$-bis-(4-hydroxyphenyl)-hexane-$\gamma\delta$-diol with the use of aluminium amalgam in moist ether (Dodds, Golberg, Lawson and Robinson. Proc. Roy. Soc., 1939, B. vol. 127, 140–167) and an electrolytic reduction process has also been described in British patent specification No. 523,515. The above reduction processes are troublesome to carry out and the isolation of the pinacol is difficult because in all reduction processes of this nature the desired pinacol is accompanied by isomers and by the secondary alcohol corresponding to the ketone and possibly by other by-products and separation of the desired pinacol from the accompanying products is slow and incomplete.

An object of the present invention is therefore, firstly, to provide an improved process whereby the isolation of the pinacol may be effected more easily and a greater yield obtained than with the known processes, and secondly to provide an improved reduction process which is more easily carried out than the processes referred to and may be followed either by the isolation process of the present invention or by any other suitable process of isolation.

According to the first part of the invention, the separation of the aforesaid pinacol obtained by reducing p-hydroxypropiophenone is effected by acylation of the phenolic hydroxy groups by means of an aromatic acylating agent, for example benzoyl chloride or toluene-p-sulphon-chloride, followed by the separation and purification of the 4:4'-acylated compound. The diacyl compound may then be hydrolysed to yield the required pinacol, or be used in further manufacture. It has in fact been found that diacyl derivatives of the above pinacol lose the elements of two molecules of water when treated with dehydrating agents and are converted into the acyl derivatives of dienoestrol.

The process has the advantage that the acylated compound crystallises quickly and almost completely out of the mixture of acyl derivatives formed, and upon hydrolysis the pinacol separates very rapidly in a crystalline and practically pure condition.

According to the second part of the invention, the reduction of the p-hydroxypropiophenone to the aforesaid pinacol is effected by the use of an amalgam in an aqueous alkaline solution. Preferred amalgams are sodium amalgam and potassium amalgam but other amalgams may be used.

When the reduction is effected with the use of an amalgam in an alkaline solution the isolation of the pinacol formed may be effected by known methods of separation but it is preferred to use the acylation method previously described.

A further object of the invention is to provide an improved process for the production of dienoestrol from the aforesaid pinacol.

Hitherto, the pinacol has been converted into dienoestrol by treatment with a mixture of acetyl chloride and acetic anhydride (Dodds et al. loc. cit.), which, while removing the elements of water, produced the diacetyl derivative of dienoestrol which was then hydrolysed.

According to this part of the invention, the phenolic hydroxy groups of the pinacol are acylated by means of an aromatic acylating agent, the acyl derivative is dehydrated by treatment with a mixture of an aliphatic acid chloride and anhydride, preferably acetyl chloride and acetic anhydride, and the dehydrated product is hydrolysed to yield dienoestrol.

As compared with the direct dehydration of the pinacol and separation of dienoestrol, the process has the advantages that the dehydration proceeds more smoothly, and the diacyl compound, for example the dibenzoate, can be isolated more conveniently and completely. The subsequent hydrolysis of the diacyl compound and crystallisation of dienoestrol present no difficulties and are carried out almost quantitatively.

An additional advantage of the process also is that the crude or only partially purified diacyl pinacol which is obtained by acylating the mixture of products obtained in the reduction of 4-hydroxypropiophenone with an alkali metal or alkaline earth metal amalgam in aqueous alkaline solution can, in accordance also with the invention, be used directly for dehydration.

Preferably, in carrying out the process, the pinacol obtained as the result of the reduction of a 4-hydroxypropiophenone with an alkali metal or alkaline earth metal amalgam in aqueous alkaline solution is converted into its diacyl derivative without first being separated from the accompanying by-products and the acyl derivative is then dehydrated, which has the double advantage that the separation of the diacyl compound from the accompanying acylated products of the reduction process can be carried out more easily and more completely than the separation of the pinacol from the other reduction products themselves and that the dehydration of the diacyl compound obtained proceeds very smoothly.

It is of course also possible, though it would not usually be advantageous, first to isolate the pinacol and then to convert it into the acyl derivative. The pinacol to be treated may be produced either by the reduction process previously described or by a known reduction process.

In order that the invention may be clearly understood and readily carried into effect, the following examples are given:

EXAMPLE 1

Preparation of γδ-bis-(4-hydroxylphenyl)-hexane-γδ-diol

A sodium amalgam is prepared containing 6 gms. of sodium and 400 g. of mercury. The amalgam is covered with a solution of 20 gms. of 4-hydroxypropiophenone in a mixture of 30 mls. of 5-N-sodium hydroxide solution and 220 mls. of water and the mixture is heated to 28–30° C. and stirred gently. The reduction is accompanied by development of heat and the temperature of the solution rises to 34–35° C., and then falls slowly. After 5 hours the alkaline solution is separated from the mercury and diluted with 3 or 4 times its volume of water, when, in order to form the benzoyl derivatives of the products, the solution is vigorously stirred, while it is being cooled, with 20 mls. of benzoyl chloride, the solution being kept at a temperature of 15–20° C. When the reaction is completed, the benzoyl derivatives are filtered off, washed with water and recrystallised from a mixture of benzene and alcohol, when a product with a melting point of 195–215° is obtained. This product is sufficiently pure, for instance, for conversion into the aforesaid pinacol or for treatment by dehydrating agents. (When purified by several recrystallisations, the dibenzoate has a melting point of 235° C.) In order to isolate the pinacol 14.5 gms. of the benzoate are hydrolysed with alcoholic potash (150 gms., containing 10 gms. of the alkali) after which the solution is diluted with water and saturated with carbon dioxide. The pinacol is extracted with ether and after removal of the ether the residue is recrystallised from acetic acid when it melts at 203–5° C.

If the pinacol dibenzoate is to be used for conversion into dienoestrol, recrystallisation is not necessary, and it is sufficient to wash the product on the filter with water, sludge well with 250 cc. of cold S. V. M. and finally filter off with suction and dry in air. The crude pinacol dibenzoate is thereby obtained as a practically white, coarse powder having a melting point of 180–200° C.

EXAMPLE 2

Preparation of dienoestrol

In order to obtain dienoestrol, 14.6 gms. of the dry 4:4'-dibenzoate of Example 1, with a melting point of 195–215° C., or of the crude dibenzoate with a melting point of 180–200° C., are refluxed with a mixture 40 mls. of acetic anhydride and 40 mls. acetylchloride by heating in an oil-bath at about 90° C. for 6 hours after which the bath temperature is increased to 120° C. and heating continued for a further 18 hours, after which time the evolution of hydrogen chloride practically ceases. The mixture is allowed to cool for several hours and the crystals which separate are filtered off and recrystallised from an alcohol-benzene mixture when the product melts at 210°–222° C. This product is converted into dienoestrol by adding 10.8 gms. of it to 100 mls. of 10% (W/V) alcoholic potassium hydroxide solution and then refluxing during 1 hour. After dilution with 200 ml. of water and filtration from a small amount of insoluble material, dienoestrol is precipitated from the alkaline solution by treatment with carbon dioxide. It is filtered off, washed with water and recrystallised from dilute alcohol after which it melts at 233–234° C. (Dodds, loc. cit. records a melting point of 227–228° C.).

EXAMPLE 3

Preparation of dienoestrol

A potassium amalgam is prepared containing 10 gms. of potassium and 400 gms. of mercury and covered with a solution of 20 gms. of p-hydroxypropiophenone in a mixture of 30 mls. 5-N-potassium hydroxide and 220 mls. of water. The mixture is stirred until no further reaction takes place and the dibenzoyl derivative is isolated as in Example 1. Dienoestrol is then produced by dehydration and hydrolysis as in Example 2.

EXAMPLE 4

Preparation of γδ-bis-(4-hydroxylphenyl)-hexane-γδ-diol

An amalgam is made by shaking 5.6 gms. calcium with 400 gms. of mercury for a considerable time and it is then stirred with a solution of 20 gms. of p-hydroxypropiophenone in 50 mls. 5-N-caustic soda and 250 mls. water during 24 hours. The mercury is then separated and the aqueous layer is filtered and benzoylated and the crude product is recrystallised from alcohol after which the benzoate which has a melting point about 200° C. is hydrolysed in the usual manner and the pinacol separated as in Example 1.

EXAMPLE 5

Preparation of dienoestrol 20 parts of p-hydroxypropiophenone are reduced with sodium amalgam as in Example 1 and the alkaline solution is diluted with an equal volume of water and shaken with 51 parts of toluene-p-sulphon-chloride at room temperature for 30 hours. The product is separated from the alkaline liquid by filtration and after recrystallisation from benzene the ditoluene-p-sulphonate of the pinacol has a melting point of 203° C.

8.5 parts of the ditoluenesulphonate are treated with a mixture of 25 parts of acetic anhydride and 25 parts of acetyl chloride. The product which crystallises on cooling may be recrystallised from a mixture of alcohol and benzene and the dienoestrol ditoluene-p-sulphonate thus obtained melts at 233° C.

8.4 parts of the dienoestrol ditoluene-p-sulphonate are hydrolysed by the action of 100 parts of a ten per cent alcoholic solution of potassium hydroxide. The solution is diluted with water and dienoestrol is precipitated by the addition of a small excess of dilute hydrochloric acid.

Various modifications of the process may be made. Thus concentration, temperatures, times of reaction and the nature of the acylating agent and dehydrating agent may be varied as may be desirable in any particular case.

We claim:

1. A process for the manufacture of the pinacol γδ-bis-(4-hydroxyphenyl)-hexane-γδ-diol which comprises reducing p-hydroxypropiophenone with an amalgam of a metal of the group consisting of alkali and alkaline earth metals in an aqueous alkaline solution, acylating the phenolic hydroxy groups of the reduction product with an aromatic acylating agent, recovering the acylated material from the reaction mixture and hydrolysing it to yield the aforesaid pinacol.

2. In a process for the manufacture of dienoestrol, the steps which comprise dehydrating, by treatment with a mixture of an aliphatic acid chloride and anhydride, the pinacol $\gamma\delta$-bis-(4-hydroxyphenyl)-hexane-$\gamma\delta$-diol in which the phenolic hydroxy groups have been acylated with an aromatic acylating agent, and recovering the dehydrated product from the reaction mixture.

3. A process for the manufacturing of dienoestrol, which comprises the steps of reducing p-hydroxypropiophenone to the corresponding pinacol with an amalgam of a metal of the group consisting of alkali and alkaline earth metals in an aqueous alkaline solution, acylating the phenolic hydroxy groups of the reduction product with an aromatic acylating agent, recovering the acylated material from the reaction mixture, dehydrating the acylated material by treatment with a mixture of an aliphatic acid chloride and anhydride, recovering the dehydrated acylated product from the reaction mixture and hydrolysing the dehydrated acylated product.

4. In a process for the manufacture of dienoestrol, the steps which comprise dehydrating by treatment with a mixture of acetyl chloride and acetic anhydride the pinacol $\gamma\delta$-bis-(4-hydroxyphenyl)-hexane-$\gamma\delta$-diol in which the phenolic hydroxy groups have been acylated with an aromatic acylating agent and recovering the dehydrated product from the reaction mixture.

5. A process for the manufacture of dienoestrol which comprises reducing p-hydroxypropiophenone to the corresponding pinacol with an amalgam of a metal of the group consisting of alkali and alkaline earth metals in an aqueous alkaline solution, acylating the phenolic hydroxy groups of the reduction product with an aromatic acylating agent, recovering the acylated material from the reaction mixture, dehydrating the acylated material by treatment with a mixture of acetyl chloride and acetic anhydride recovering the dehydrated product from the reaction mixture, and hydrolysing the dehydrated acylated product.

6. A process for the production of the pinacol $\gamma\delta$-bis-(4-hydroxyphenyl)-hexane-$\gamma\delta$-diol which comprises the step of reducing p-hydroxypropiophenone by treatment with an amalgam of a metal of the group consisting of alkali and alkaline earth metals in an aqueous alkaline solution.

7. A process for the manufacture of the pinacol $\gamma\delta$-bis-(4-hydroxyphenyl)-hexane-$\gamma\delta$-diol which comprises reducing p-hydroxypropiophenone with an amalgam of a metal of the group consisting of alkali and alkaline earth metals in an aqueous alkaline solution, acylating the phenolic hydroxy groups of the reduction product with benzoyl chloride, recovering the benzoylated material from the reaction mixture and hydrolysing it to yield the aforesaid pinacol.

8. In a process for the manufacture of dienoestrol the steps which comprise dehydrating by treatment with a mixture of an aliphatic acid chloride and anhydride, the pinacol $\gamma\delta$-bis-(4-hydroxyphenyl)-hexane-$\gamma\delta$-diol in which the phenolic hydroxy groups have been benzoylated and recovering the dehydrated product from the reaction mixture.

9. A process for the manufacture of dienoestrol, which comprises reducing p-hydroxypropiophenone to the corresponding pinacol with an amalgam of a metal of the group consisting of alkali and alkaline earth metals in an aqueous alkaline solution, benzoylating the phenolic hydroxy groups of the reduction product, recovering the benzoylated product from the reaction mixture dehydrating the benzoylated material by treatment with a mixture of an aliphatic acid chloride and anhydride, recovering the dehydrated product from the reaction mixture and hydrolysing the dehydrated benzoylated product.

10. In a process for the manufacture of dienoestrol, the steps which comprise dehydrating by treatment with a mixture of acetyl chloride and acetic anhydride the pinacol $\gamma\delta$-bis-(4-hydroxyphenyl)-hexane-$\gamma\delta$-diol in which the phenolic hydroxy groups have been benzoylated, and recovering the dehydrated product from the reaction mixture.

11. A process as claimed in claim 1 in which the acylating agent is toluene-p-sulphonchloride.

12. A process as claimed in claim 2 in which the acylating agent is toluene-p-sulphonchloride.

13. A process as claimed in claim 3 in which the acylating agent is toluene-p-sulphonchloride.

14. A process as claimed in claim 4 in which the acylating agent is toluene-p-sulphonchloride.

15. A process for the manufacture of dienoestrol, which comprises reducing p-hydroxypropiophenone to the corresponding pinacol with an amalgam of a metal of the group consisting of alkali and alkaline earth metals in an aqueous alkaline solution, acylating the phenolic hydroxy groups of the reduction product with an aromatic acylating agent, dehydrating the acylated product with a mixture of an aliphatic acid chloride and anhydride, recovering the dehydrated acylated product from the reaction mixture and hydrolysing the dehydrated acylated product.

16. A process for the production of the pinacol $\gamma\delta$-bis-(4-hydroxyphenyl)-hexane-$\gamma\delta$-diol which comprises the step of reducing p-hydroxypropiophenone by treatment with sodium amalgam in an aqueous alkaline solution.

17. A process for the production of the pinacol $\gamma\delta$-bis-(4-hydroxyphenyl)-hexane-$\gamma\delta$-diol which comprises the step of reducing p-hydroxypropiophenone by treatment with potassium amalgam in an aqueous alkaline solution.

18. In a process for the production of a purified pinacol compound from p-hydroxypropiophenone by a method including the reduction of such phenone with an amalgam of a metal of the group consisting of alkali and alkaline earth metals in an aqueous alkaline solution, the steps which comprise reacting with an aromatic acylating agent the pinacol $\gamma\delta$-bis-(4-hydroxyphenyl)-hexane-$\gamma\delta$-diol together with the by-products obtained in the reduction of p-hydroxypropiophenone and recovering the acylated pinacol from the reaction mixture.

WALLACE FRANK SHORT.
GORDON IVAN HOBDAY.

REFERENCES CITED

The following references are of record in the file of this patent:

UNITED STATES PATENTS

| Number | Name | Date |
| --- | --- | --- |
| 2,349,770 | Tendick | May 23, 1944 |
| 2,385,853 | Turnbull | Oct. 2, 1945 |
| 2,395,934 | Miescher et al. | Mar. 5, 1946 |